United States Patent
El Naga et al.

(10) Patent No.: US 10,898,968 B2
(45) Date of Patent: Jan. 26, 2021

(54) SCATTER REDUCTION IN ADDITIVE MANUFACTURING

(71) Applicant: DIVERGENT TECHNOLOGIES, INC., Los Angeles, CA (US)

(72) Inventors: Eahab Nagi El Naga, Topanga, CA (US); John Russell Bucknell, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 633 days.

(21) Appl. No.: 15/582,493

(22) Filed: Apr. 28, 2017

(65) Prior Publication Data

US 2018/0311758 A1    Nov. 1, 2018

(51) Int. Cl.
| | |
|---|---|
| *B23K 15/00* | (2006.01) |
| *B22F 3/105* | (2006.01) |
| *B33Y 10/00* | (2015.01) |
| *B33Y 30/00* | (2015.01) |

(52) U.S. Cl.
CPC ........ *B23K 15/0086* (2013.01); *B22F 3/1055* (2013.01); *B22F 2003/1056* (2013.01); *B22F 2999/00* (2013.01); *B33Y 10/00* (2014.12); *B33Y 30/00* (2014.12)

(58) Field of Classification Search
CPC . B23K 15/0086; B23K 26/342; B23F 3/1055; B22F 2203/1056; B22F 2203/1058; B22F 2999/00; B22F 2202/06; B33Y 10/00; B33Y 30/00
See application file for complete search history.

(56) References Cited

U.S. PATENT DOCUMENTS

| | | |
|---|---|---|
| 5,203,226 A | 4/1993 | Hongou et al. |
| 5,742,385 A | 4/1998 | Champa |
| 5,990,444 A | 11/1999 | Costin |

(Continued)

FOREIGN PATENT DOCUMENTS

| | | | |
|---|---|---|---|
| CN | 105665708 A | * | 6/2016 |
| CN | 106536165 A | | 3/2017 |

(Continued)

OTHER PUBLICATIONS

US 9,202,136 B2, 12/2015, Schmidt et al. (withdrawn)

(Continued)

*Primary Examiner* — Ibrahime A Abraham
*Assistant Examiner* — John J Norton
(74) *Attorney, Agent, or Firm* — Arent Fox LLP

(57) ABSTRACT

Systems and methods for reducing charged powder particle scattering in powder-bed fusion (PBF) systems are provided. A PBF apparatus can include a structure that supports a layer of powder material having a plurality of particles of powder. For example, the structure can be a build plate, a build floor, a build piece, etc. The apparatus can also include an energy beam source that generates an energy beam and a deflector that applies the energy beam to fuse an area of the powder material in the layer. The energy beam can electrically charge the particles of powder. The apparatus can also include an electrical system that generates an electrical force between the structure and the charged particles of powder. For example, the electrical system can include a voltage source that applies a first voltage to the structure.

13 Claims, 12 Drawing Sheets

(56) References Cited

U.S. PATENT DOCUMENTS

| | | |
|---|---|---|
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |

(56) References Cited

U.S. PATENT DOCUMENTS

| | | |
|---|---|---|
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Feffatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |

(56) References Cited

U.S. PATENT DOCUMENTS

| | | | |
|---|---|---|---|
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,500,834 B2 | 12/2019 | Furukawa |
| 2006/0108783 A1 | 5/2006 | Ni et al. |
| 2010/0270708 A1* | 10/2010 | Jonasson | B22F 3/1055 264/401 |
| 2014/0277669 A1 | 9/2014 | Nardi et al. |
| 2015/0306699 A1* | 10/2015 | Honda | B22F 3/1055 264/430 |
| 2016/0368056 A1* | 12/2016 | Swaminathan | B22F 1/02 |
| 2017/0113344 A1 | 4/2017 | Schönberg |
| 2017/0246709 A1* | 8/2017 | Guerrier | B33Y 10/00 |
| 2017/0341309 A1 | 11/2017 | Piepenbrock et al. |

FOREIGN PATENT DOCUMENTS

| | | |
|---|---|---|
| JP | 6019267 B1 | 11/2016 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016044561 A1 | 3/2016 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
K.E. Lulay, K. Khan and D. Chaaya: "The Effect of Cryogenic Treatments on 7075 Aluminum Alloy," Journal of Materials Engineering and Performance, Oct. 2002, vol. 11(5), pp. 479-480.
P. Gargarella; S. Pauly; M. Samadi Khoshkhoo; U. Kuhn; and J. Eckert: "Phase Formation and Mechanical Properties of Ti—Cu—Ni—Zr Bulk Metallic Glass Composites," ScienceDirect, Acta Materialia 65 (2014) 259-269.
B.A. Sun; M.X. Pan; D.Q. Zhao; W.H. Wang; X.K. Xi; M.T. Sandor; and Y. Wu: "Aluminum-Rich Bulk Metallic Glasses," Institute of Physics, Chinese Academy of Sciences, Beijing 100190, China, Department of Physics and Astronomy, University of North Carolina, Chapel Hill, NC 27599-3255, ScienceDirect, Scripta Materialia 59 (2008) 1159-1162.
J. Ilcik; D. Koutny; and D. Palousek: "Geometrical Accuracy of the Metal Parts Produced by Selective Laser Melting: Initial Tests," Lecture Notes in Mechanical Engineering, DOI: 10.1007/978-3-319-05203-8_76, © Springer International Publishing Switzerland 2014.
S. Chianrabutra; B.G. Mellor; and S. Yang: "A Dry Powder Material Delivery Device for Multiple Material Additive Manufacturing," Engineering Sciences Unit, Faculty of Engineering and the Environment, University of Southampton, Southampton SO17 1BJ, United Kingdom, 2014.
Di Xie; Sujun Wu; Juan Guan; Lin Yan; and Jinyan Cui: "Effect of Cryogenic Treatment on the Fatigue Crack Propagation Behavior of 7075 Aluminum Alloy," School of Material Science and Engineering, Beihang University, Beijing 100191, China, 2014.
Nandwana, P., et al., Recyclability Study on Inconel 718 and Ti-6Al-4V Powders for Use in Electron Beam Melting, U.S. Department of Energy, 21 pages.
European Supplemental Search Report for Europen Application No. 18791416.3, dated Oct. 16, 2020, 33 pages.

* cited by examiner

SCATTER REDUCTION IN ADDITIVE MANUFACTURING

BACKGROUND

Field

The present disclosure relates generally to additive manufacturing (AM), and more particularly, to reducing charged powder scattering in AM applications, such as powder-bed fusion (PBF).

Background

PBF systems can produce structures (referred to as build pieces) with geometrically complex shapes, including some shapes that are difficult or impossible to create with conventional manufacturing processes. PBF systems create build pieces layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

Some energy beams that are used to fuse the powder layer can also cause some of the particles of powder to scatter or fly away from the layer. For example, applying an electron beam to a powder layer can electrically charge some of the particles of powder. The electrical charges on the powder particles repel each other and cause some of the particles to fly off the powder layer, a phenomenon also known as 'smoking.' In some cases, the scattered powder interferes with the AM operation and can result in poor quality build pieces.

SUMMARY

Several aspects of apparatuses and methods for reducing powder scatter in PBF systems will be described more fully hereinafter.

In various aspects, an apparatus for powder-bed fusion can include a structure that supports a layer of powder material having a plurality of particles of powder, an energy beam source that generates an energy beam, and a deflector that applies the energy beam to fuse an area of the powder material in the layer. The energy beam can electrically charge the particles of powder. The apparatus can also include an electrical system that generates an electrical force between the structure and the charged particles of powder.

In various aspects, an apparatus for PBF can include one or more structures including a powder material support structure, an energy beam source directed to the powder material support surface, a deflector operationally coupled with the energy beam source, and a voltage source connected to at least one of the structures.

Other aspects will become readily apparent to those skilled in the art from the following detailed description, wherein is shown and described only several exemplary embodiments by way of illustration. As will be realized by those skilled in the art, concepts described herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects will now be presented in the detailed description by way of example, and not by way of limitation, in the accompanying drawings, wherein.

DETAILED DESCRIPTION

Figure 1A:
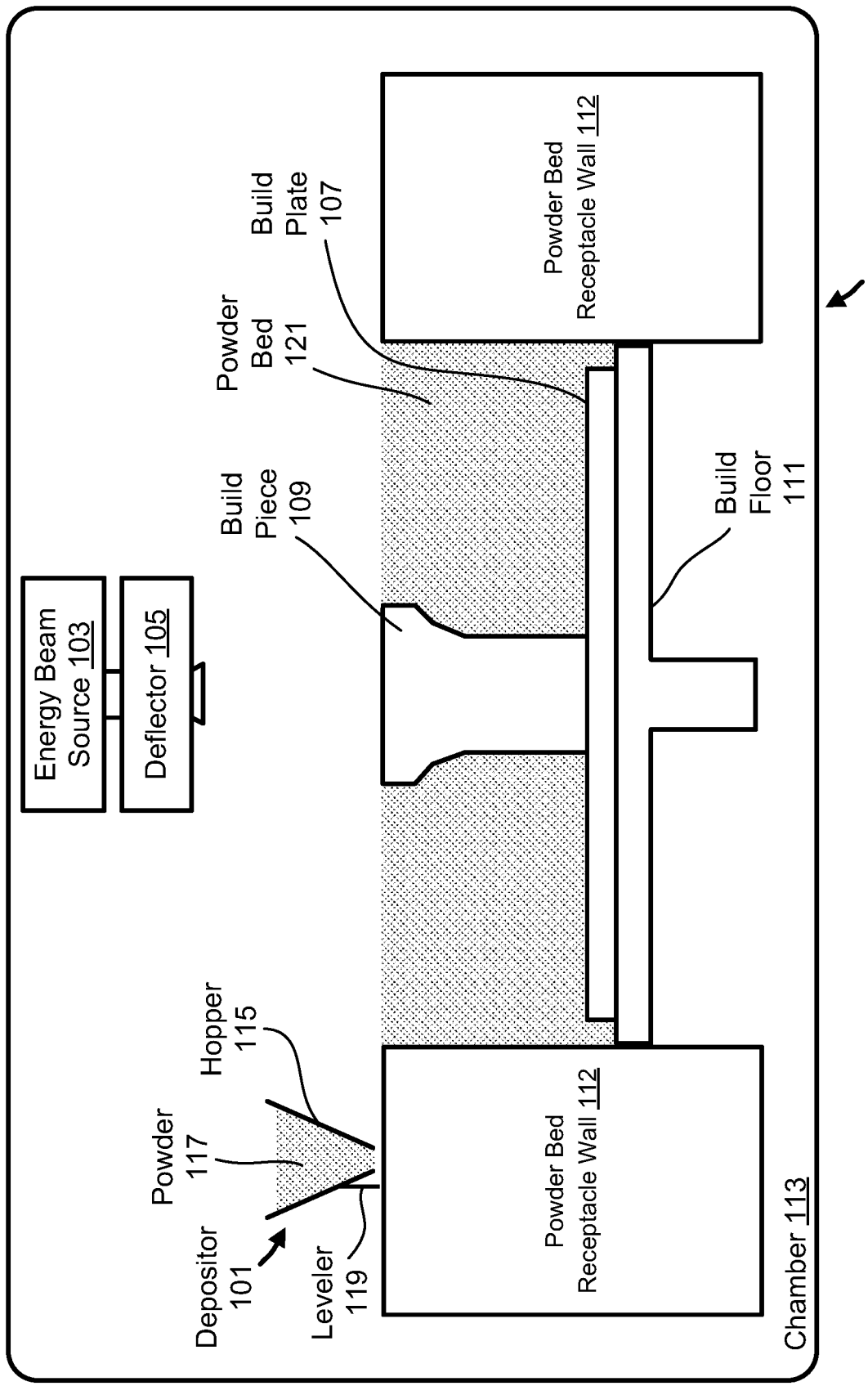
FIG. 1A-D illustrate an example PBF system during different stages of operation.

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other exemplary embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

This disclosure is directed to reducing charged powder scattering, i.e., smoking, in PBF systems. The PBF system can be built, for example, such that one or more structures in the system can be charged to create an electrical force between the charged particles of powder and the powder layer. The electrical force can keep the charged particles of powder from flying off of the powder layer. For example, the build piece can be electrically charged such that the build piece is an anode, or pseudo-anode, to cause charge-accumulated powder particles to be attracted to the bed instead of repelled. Further, charged static shields can be placed with negative potential, with a near uniform field to reduce beam deflection, to prevent charge-accumulated particles from being attracted to the build chamber. Any deflections created by these mechanisms can be characterized by control systems of the PBF system, and compensations can be provided in the original beam deflection commands.

FIGS. 1A-D illustrate an example PBF system 100 during different stages of operation. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. PBF system 100 can also include a build floor 111 positioned within a powder bed receptacle. The walls of the powder bed receptacle are shown as powder bed receptacle walls 112. Build floor 111 can lower build plate 107 so that depositor 101 can deposit a next layer and a chamber 113 that can enclose the other components. Depositor 101 can include a hopper 115 that contains a powder 117, such as a metal powder, and a leveler 119 that can level the top of each layer of powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 50 layers, to form the current state of build piece 109, e.g., formed of 50 slices. The multiple layers already deposited have created a powder bed 121, which includes powder that was deposited but not fused.

Figure 1B:
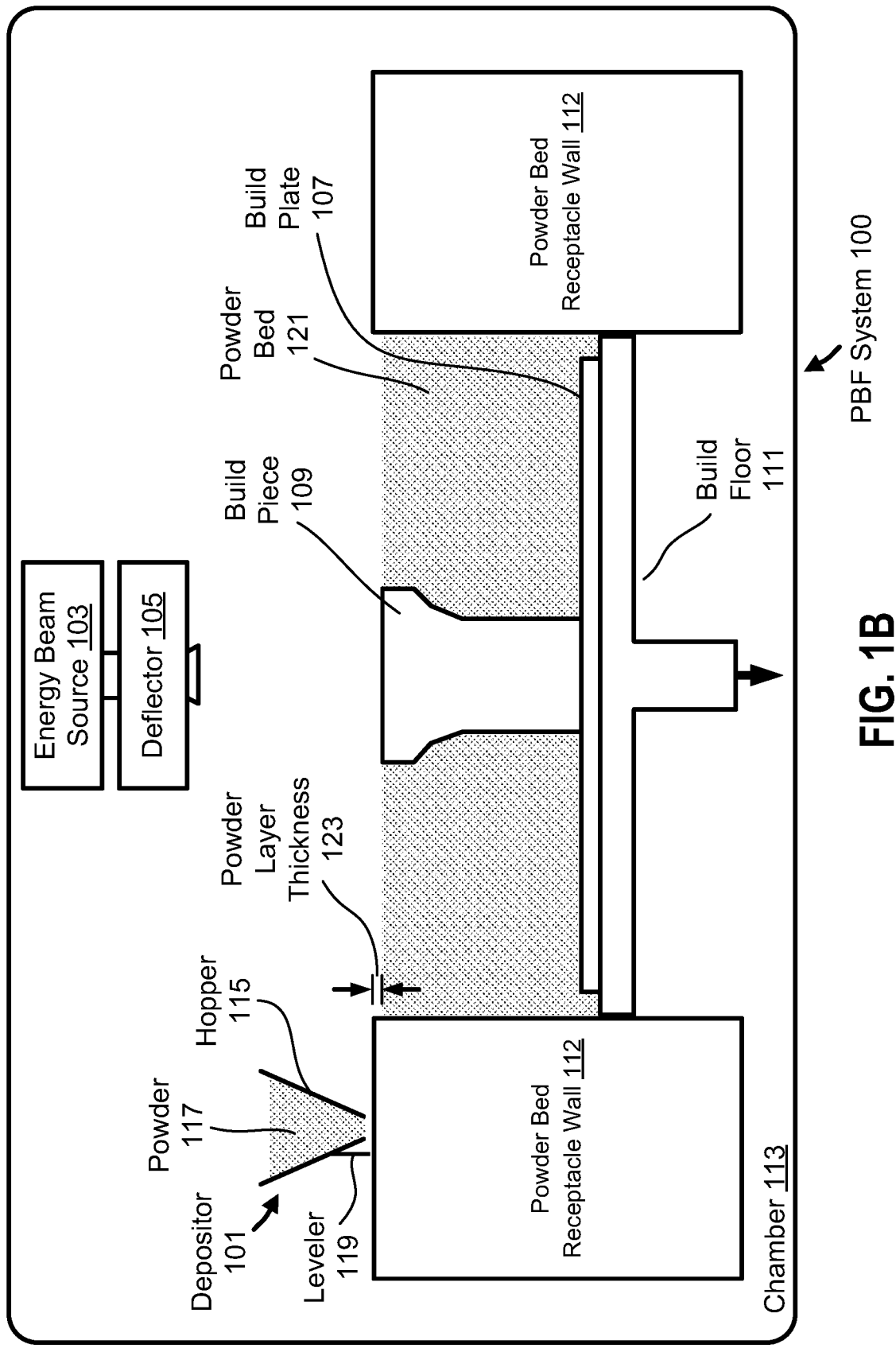

FIG. 1B shows PBF system 100 at stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by the powder layer thickness. In this way, for example, a space of with a consistent thickness equal to powder layer thickness 123 can be created over the top of build piece 109 and powder bed 121.

Figure 1C:
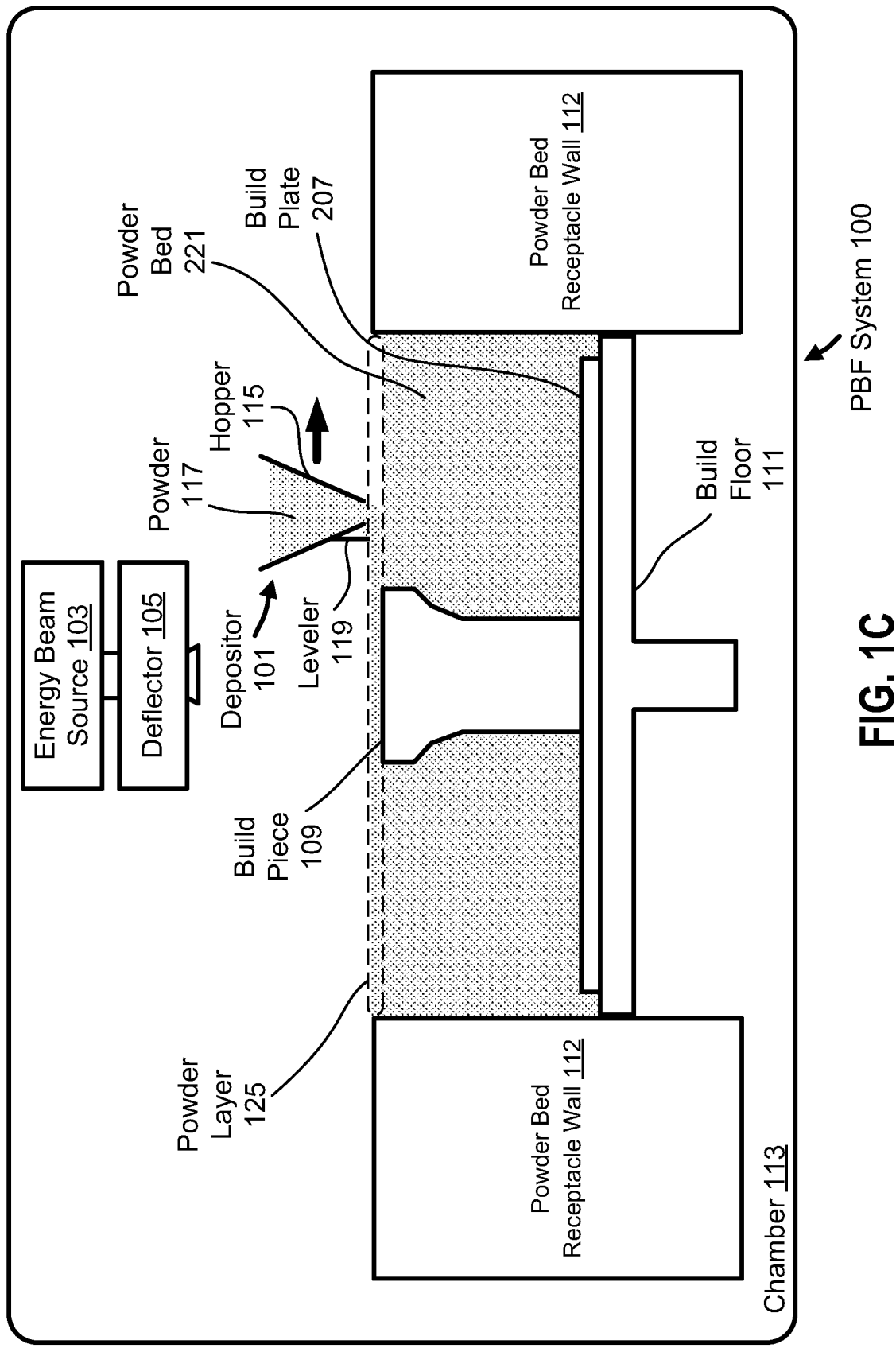

FIG. 1C shows PBF system 100 at a stage in which depositor 101 can deposit powder 117 in the space created over the top of build piece 109 and powder bed 121. In this example, depositor 101 can cross over the space while releasing powder 117 from hopper 115. Leveler 119 can level the released powder to form a powder layer 125 that has a thickness of powder layer thickness 123. Thus, the powder in a PBF system can be supported by a powder material support structure, which can include, for example, a build plate, a build floor, a build piece, etc. It should be noted, that elements of FIGS. 1A-D and the other figures in this disclosure are not necessarily drawn to scale, but may be drawn larger or smaller for the purpose of better illustration of concepts described herein. For example, the illustrated thickness of powder layer 125 (i.e., powder layer thickness 123) is greater than an actual thickness used for the example 50 previously-deposited layers.

Figure 1D:
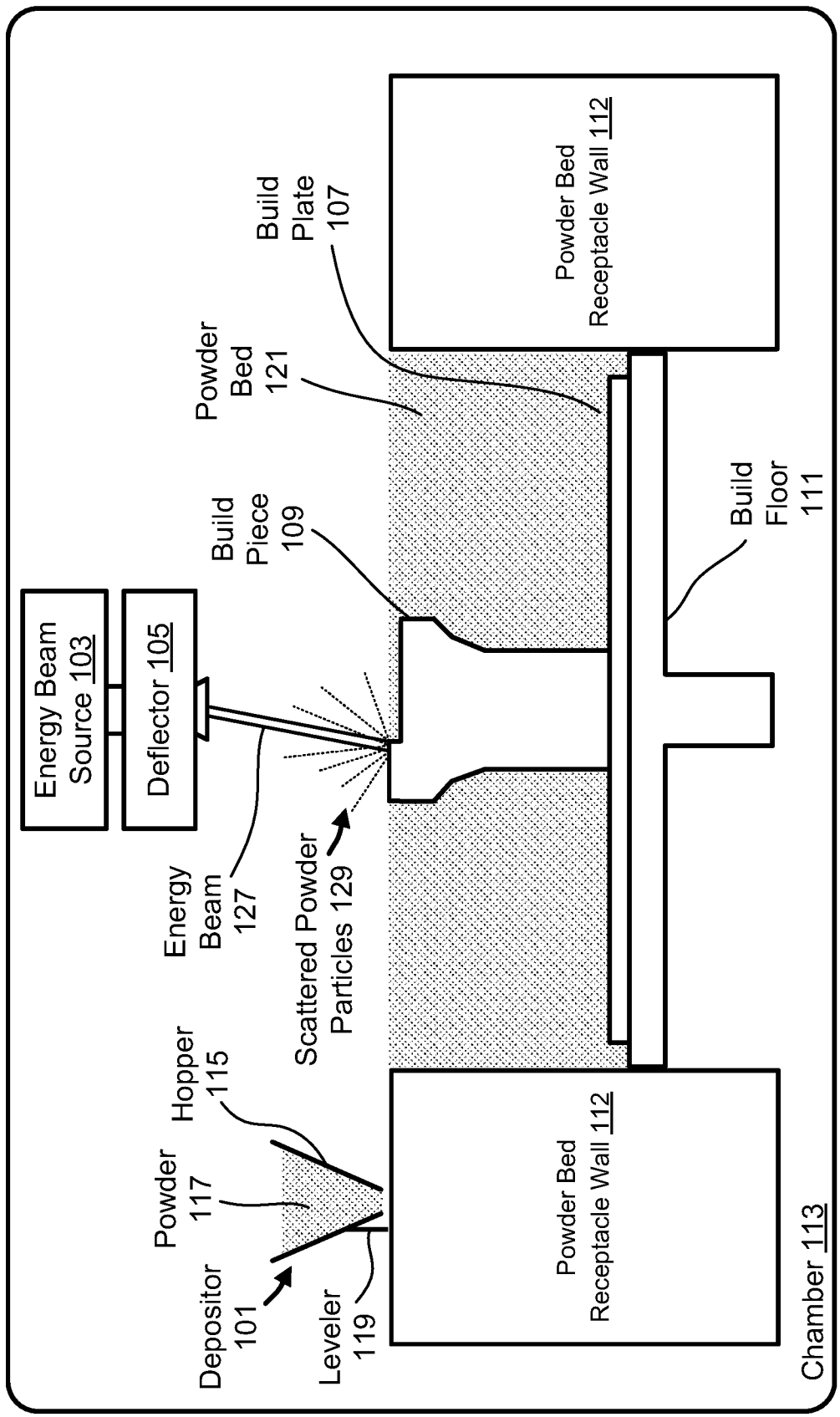

FIG. 1D shows PBF system 100 at a stage in which energy beam source 103 can generate an energy beam 127 and deflector 105 can apply the energy beam to fuse the next slice in build piece 109. In various embodiments, energy beam source 103 can be an electron beam source, energy beam 127 can be an electron beam, and deflector 105 can include deflection plates that can generate an electric field or a magnetic field that deflects the electron beam to scan across areas to be fused. In various embodiments, energy beam source 103 can be a laser, energy beam 127 can be a laser beam, and deflector 105 can include an optical system that can reflect and/or refract the laser beam to scan across areas to be fused. In various embodiments, the deflector can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

The application of energy beam 127 can cause particles of powder to fly away from the powder layer, shown in FIG. 1D as scattered powder particles 129. As noted above, scattered powder particles 129 can interfere with the printing operation and can result in poorer quality build pieces.

Figure 2:
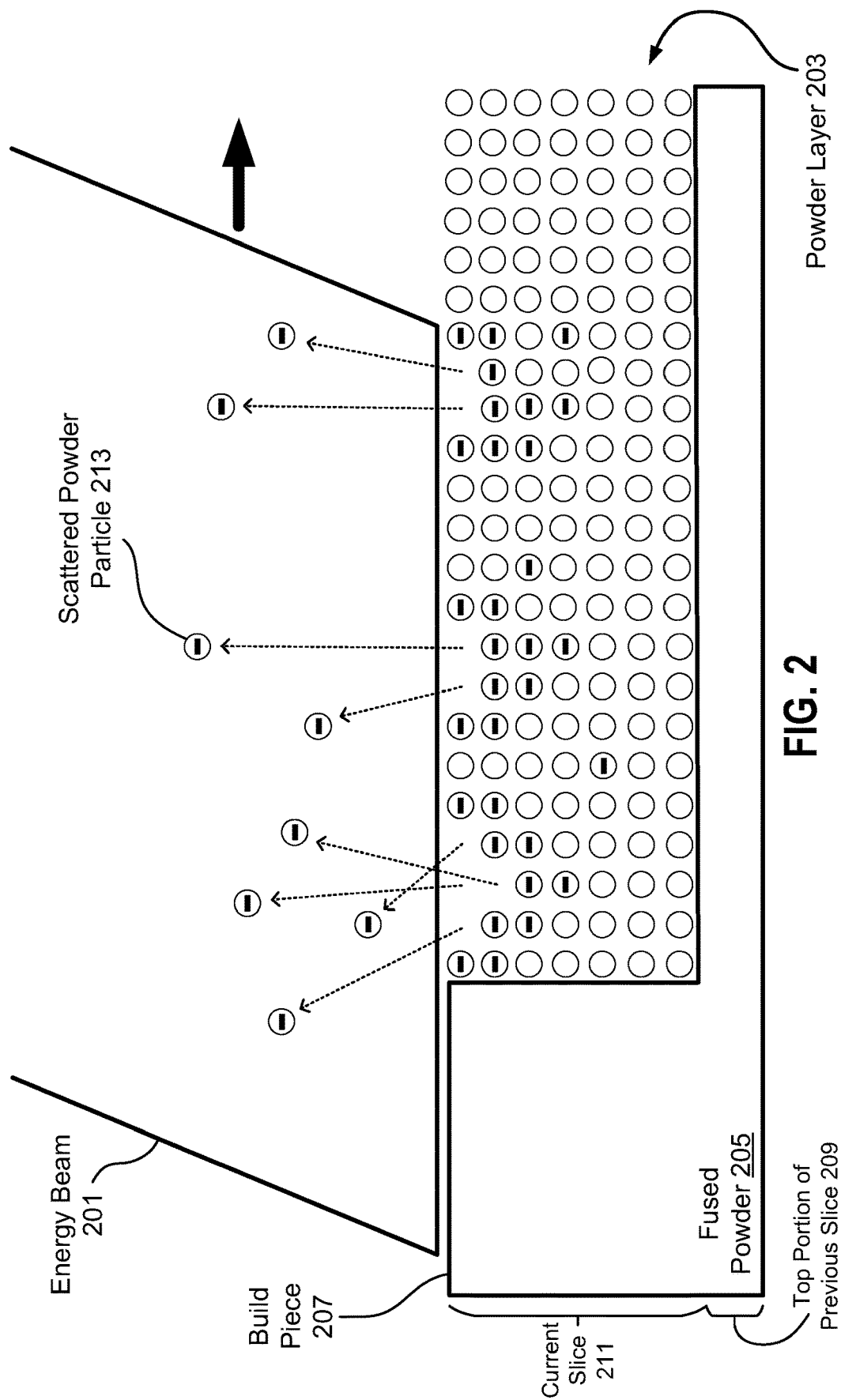
FIG. 2 shows a close-up view illustrating an example of particle scattering in PBF.

FIG. 2 shows a close-up view illustrating an example of particle scattering in PBF. In particular, FIG. 2 shows an energy beam 201 scanning across a powder layer 203 in the direction of the bold arrow (i.e., scanning to the right). As energy beam 201 is applied, powder is fused into fused powder 205 to form build piece 207. In the view shown in FIG. 2, a top portion of the previous slice 209 can be seen, as well as the portion of the current slice 211 that has been fused so far. As energy beam 201 is applied to an area of powder layer 203 to heat and fuse the area, some of the powder particles can become charged. In this example, some of the powder particles can become negatively charged, and these charged powder particles are represented by a "−" symbol. For example, energy beam 201 can be an electron beam, which is a beam of electrons, i.e., negatively-charged particles. The electrons in the electron beam can be captured by powder particles, such that the powder particles become negatively charged.

Negatively-charged objects repel each other due to the electrostatic force. As illustrated in FIG. 2, if enough negatively-charged powder particles are in close proximity, the repulsive electrostatic force between them can overcome the force of gravity, causing some of the charged powder particles to fly upward from powder layer 203. These powder particles are shown as scattered powder particles 213.

Figure 3:
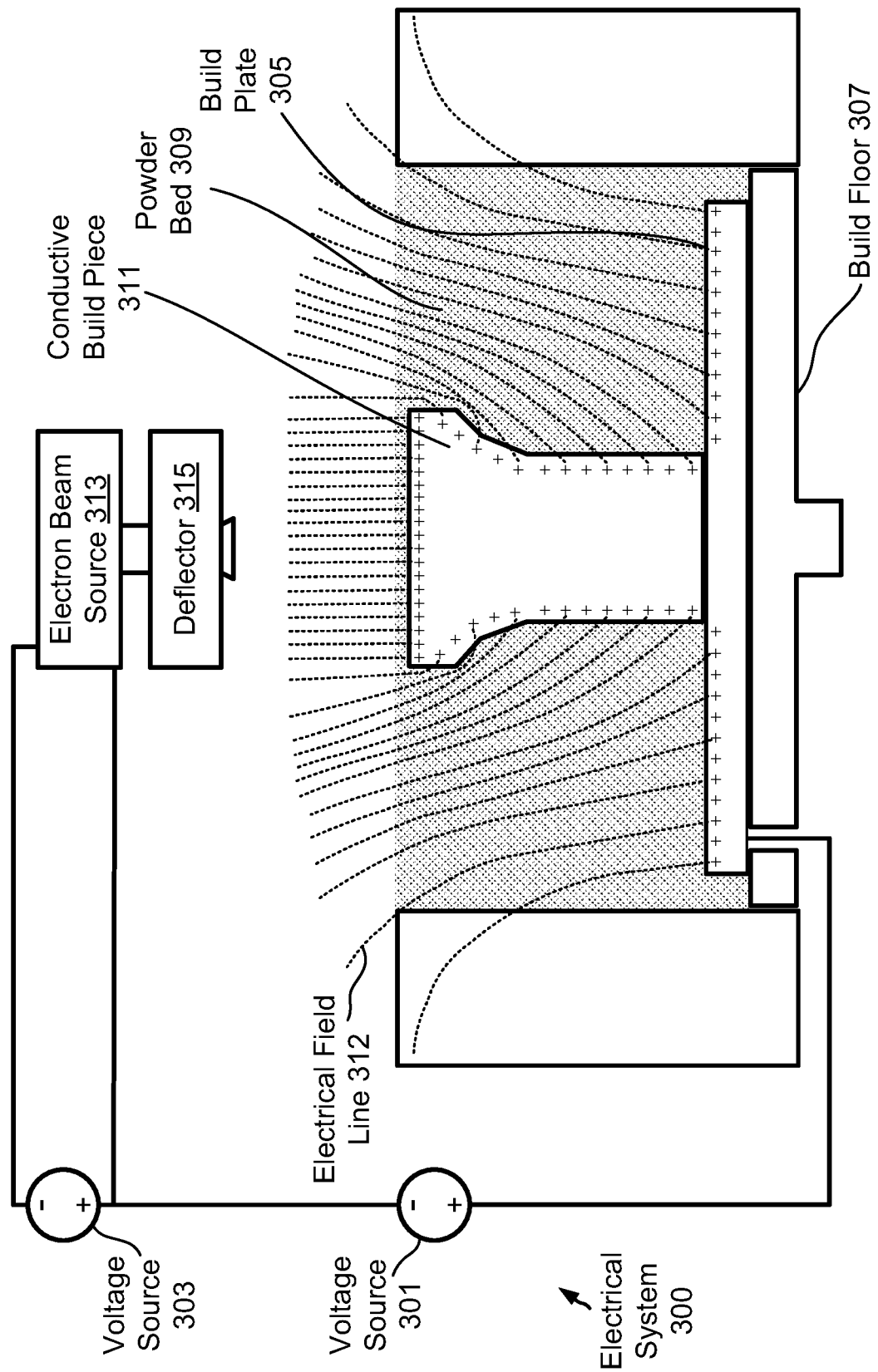
FIG. 3 illustrates another exemplary embodiment of an electrical system implementation for reducing powder scattering.

FIG. 3 illustrates another exemplary embodiment of an electrical system implementation for reducing powder scattering. An electrical system 300 can include a voltage source 301 and a voltage source 303. In this example, the positive terminal of voltage source 301 can be connected to a build plate 305 through an opening in a build floor 307. Build plate 305 and build floor 307 can support a powder bed 309 and a conductive build piece 311. For example, conductive build piece 311 can be formed of a metal or other conductive material.

In this example, build plate 305 can be electrically conductive and can be electrically connected to conductive build piece 311. For example, conductive build piece 311 can be fused to build plate 305. The connection of build plate 305 to voltage source 301 can cause positive charge to collect on the build plate and on the conductive build piece. The positive charge can create an electric field, shown by electric field lines 312. In this example, because positive charge can collect at the top of conductive build piece 311, the electric field through the powder layer on top of the build piece may be stronger compared to the electric field in the example of FIG. 3, particularly if the top of the build piece is far away from the build plate. This may allow electrical system 300 to more efficiently reduce powder scatter.

Voltage source 303 can be applied to an electron beam source 313 as the acceleration voltage used to create the electron beam, which can be scanned by a deflector 315 to fuse powder. In this case, the positive terminal of voltage source 303 is the anode of electron beam source 313. Voltage source 301 is also connected to the anode of electron beam source 313, such that voltage source 301 is applied between the anode and build plate 305. In this way, for example, the voltage applied by voltage source 301 can help reduce powder scatter and increase beam modulation gain by further accelerating the beam for greater beam energy.

Figure 4:
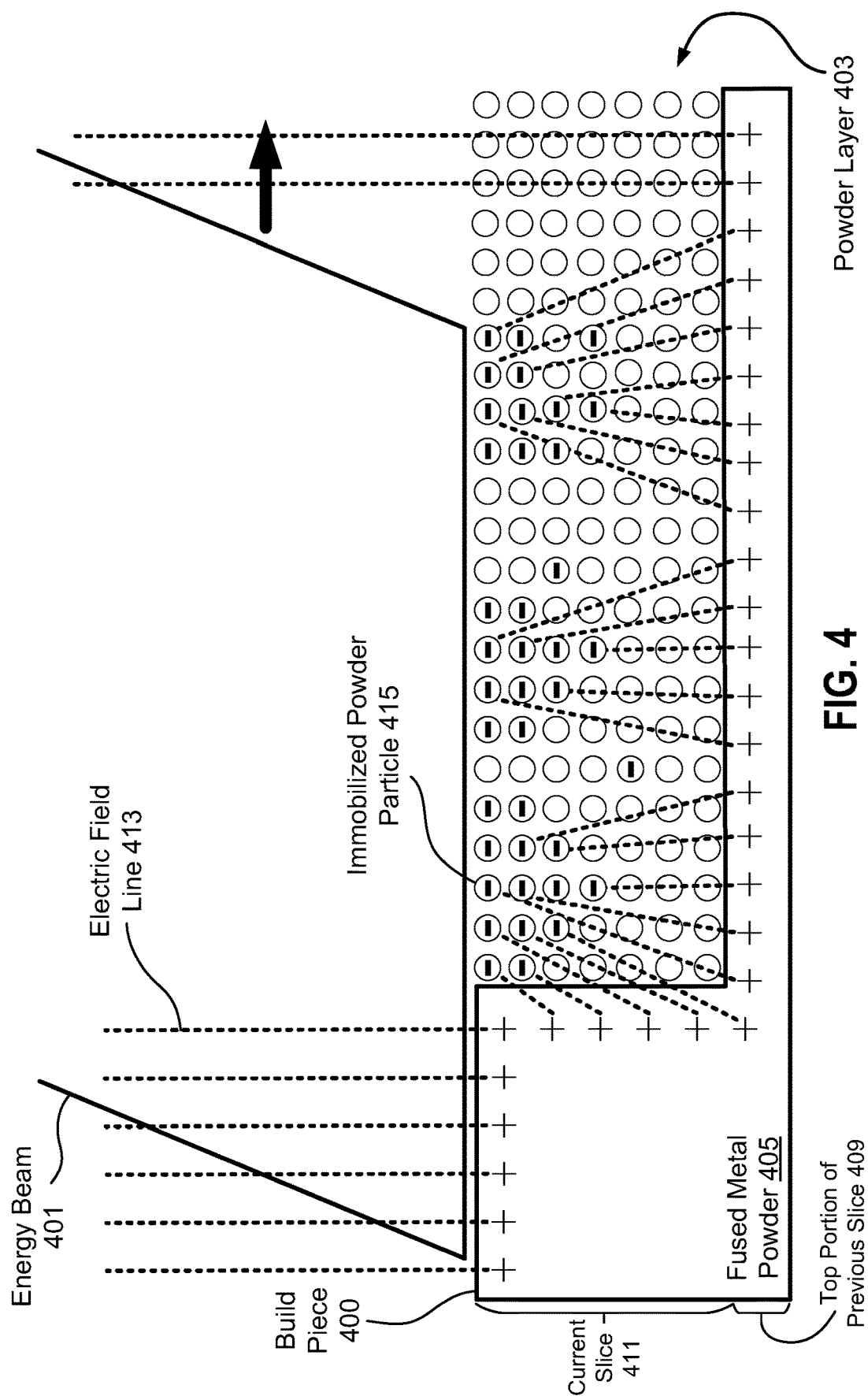
FIG. 4 shows a close-up view illustrating an exemplary embodiment of reducing particle scattering.

FIG. 4 shows a close-up view illustrating an exemplary embodiment of reducing particle scattering. In particular, FIG. 4 illustrates the top of a conductive build piece 400, such as conductive build piece 311 above. An energy beam 401 scanning across a powder layer 403 in the direction of the bold arrow (i.e., scanning to the right). As energy beam 401 is applied, powder is fused into fused powder 405 to form build piece 400. In the view shown in FIG. 4, a top portion of the previous slice 409 can be seen, as well as the portion of the current slice 411 that has been fused so far. As energy beam 401 is applied to an area of powder layer 403 to heat and fuse the area, some of the powder particles can become charged. In this example, some of the powder particles can become negatively charged, as represented by the "−" symbol. For example, energy beam 201 can be an electron beam, and the electrons in the electron beam can be captured by powder particles, such that the powder particles become negatively charged.

In this example, conductive build piece 400 can be connected to an electrical system such as electrical system 300 in FIG. 3 above, such that positive charge collects at the top of the conductive build piece. The positive charge can create an electric field, shown as electric field lines 413, that can attract the negatively charge powder particles. The attraction is shown in FIG. 4 by electric field lines 413 between the positive and negative charges. The attractive force exerted by the electric field on the negatively-charged powder particles can be greater than the repulsive force between the powder particles, and the negatively-charged powder particles can be prevented from flying upward, as illustrated by immobilized powder particle 415. In this way, for example, powder scattering may be reduced or eliminated.

Figure 5:
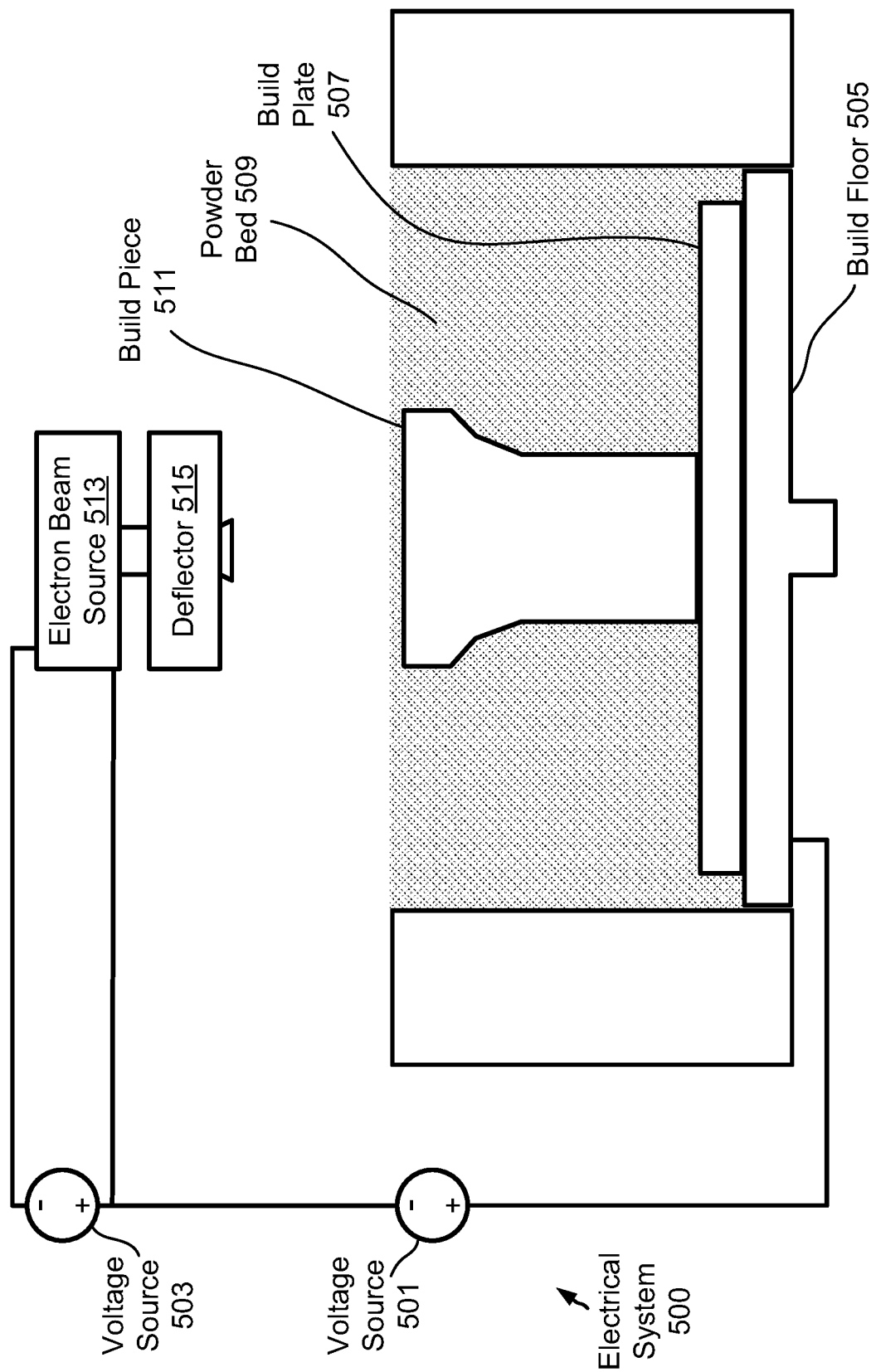
FIG. 5 illustrates another exemplary embodiment of an electrical system implementation for reducing powder scattering.

FIG. 5 illustrates another exemplary embodiment of an electrical system implementation for reducing powder scattering. An electrical system 500 can include a voltage source 501 and a voltage source 503. In this example, the positive terminal of voltage source 501 can be connected to a build floor 505, which supports a build plate 507, a powder bed 509, and a build piece 511. In this implementation, build floor 505 can be electrically conductive. In other implementations, build plate 507 can also be electrically conductive. In other implementations, build plate 507 and build piece 511 can also be electrically conductive. Different electric fields can be generated in the different implementations to reduce or eliminate powder scatter.

Voltage source 503 can be applied to an electron beam source 513 as the acceleration voltage used to create the electron beam, which can be scanned by a deflector 515 to fuse powder. In this case, the positive terminal of voltage source 503 is the anode of electron beam source 513. Voltage source 501 is also connected to the anode of electron beam source 513, such that voltage source 501 is applied between the anode and build floor 505. In this way, for example, the voltage applied by voltage source 501 can help reduce powder scatter and increase beam modulation gain by further accelerating the beam for greater beam energy.

Figure 6:
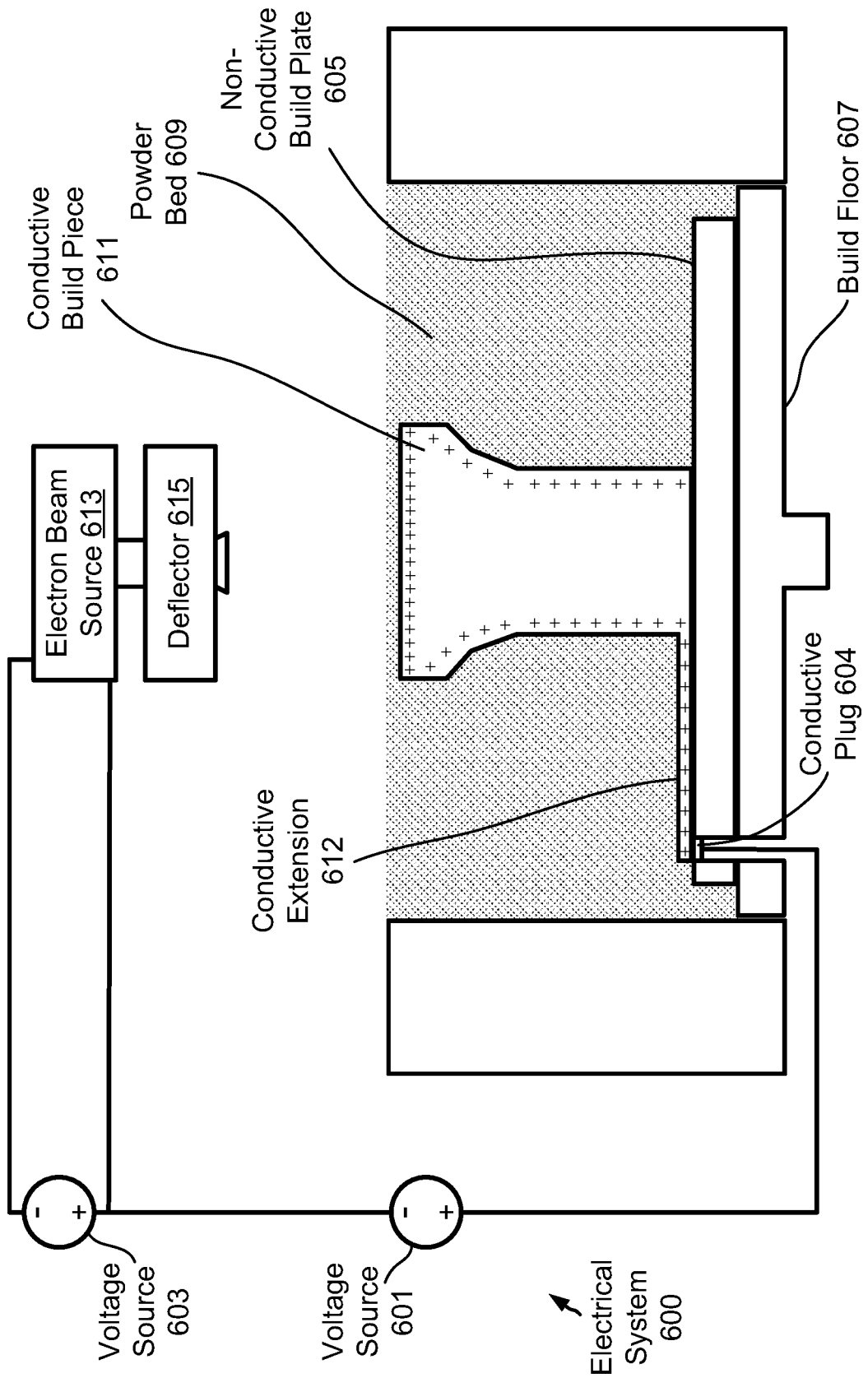
FIG. 6 illustrates another exemplary embodiment of an electrical system implementation for reducing powder scattering.

FIG. 6 illustrates another exemplary embodiment of an electrical system implementation for reducing powder scattering. An electrical system 600 can include a voltage source 601 and a voltage source 603. In this example, the positive terminal of voltage source 601 can be connected to a conductive plug 604 in a non-conductive build plate 605 through an opening in a build floor 607. Non-conductive build plate 605 and build floor 607 can support a powder bed 609 and a conductive build piece 611. For example, conductive build piece 611 can be formed of a metal or other conductive material.

In this example, when printing the first few layers of conductive build piece 611, the PBF system also prints a conductive extension 612 that can connect the conductive build piece to conductive plug 604. In this way, for example, voltage source 601 can be connected to conductive build piece 611 to cause positive charge to collect on the conductive build piece. The electric field (not shown) generated by the positive charge collected on conductive build piece 611 can help reduce or eliminate powder scatter from powder layers on top of the build piece. Because the positive charge is collected on conductive build piece 611, but not on non-conductive build plate 605, the electric field may be concentrated in the build piece without requiring the build plate to be charged. In this way, for example, the voltage generated by voltage source 601 may be reduced.

Voltage source 603 can be applied to an electron beam source 613 as the acceleration voltage used to create the electron beam, which can be scanned by a deflector 615 to fuse powder. In this case, the positive terminal of voltage source 603 is the anode of electron beam source 613. Voltage source 601 is also connected to the anode of electron beam source 613, such that voltage source 601 is applied between the anode and build plate 605. In this way, for example, the voltage applied by voltage source 601 can help reduce powder scatter and increase beam modulation gain by further accelerating the beam for greater beam energy.

In various embodiments, one or more conductive extensions could be formed in various shapes and configurations to connect one or more build pieces to a voltage source. For example, multiple build pieces could be connected by a lattice of conductive extensions. In various embodiments, a conductive extension need not be directly connected between each build piece and the voltage source. For example, a first conductive extension could connect a first build piece to the voltage source (e.g., directly connect to a conductive plug, such as in FIG. 6), and a second conductive extension could connect the first build piece directly to a second build piece. In this way, for example, the second build piece can be connected to the voltage source through the first build piece (i.e., not directly connected).

Figure 7:
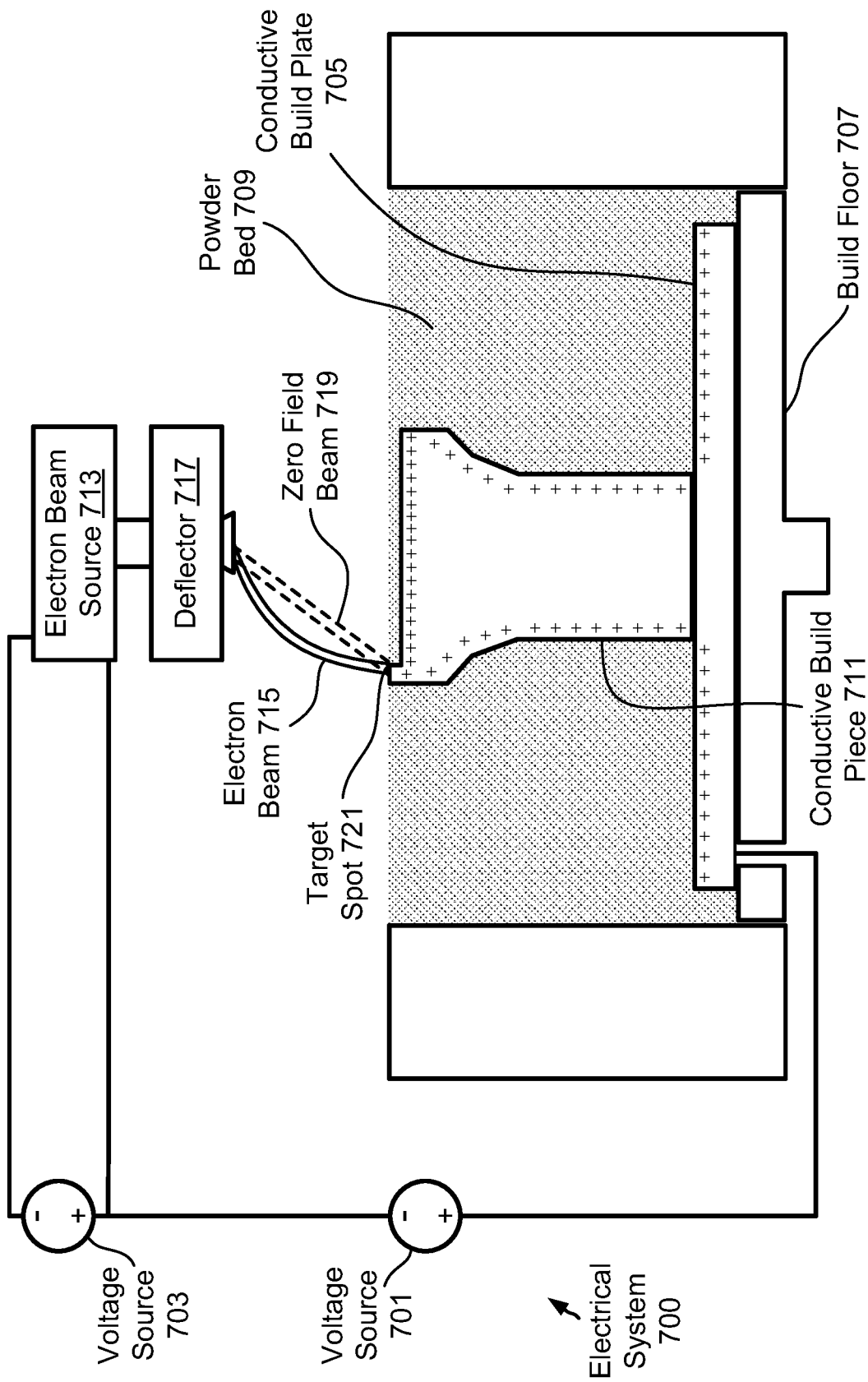
FIG. 7 illustrates an example beam error caused by an electric field.

FIG. 7 illustrates an example beam error caused by an electric field. An electrical system 700, including a voltage source 701 and a voltage source 703. The positive terminal of voltage source 701 can be connected to a conductive build plate 705 through an opening in a build floor 707. Conductive build plate 705 and build floor 707 can support a powder bed 709 and a conductive build piece 711. Conductive build plate 705 can be electrically connected to conductive build piece 711, such as being fused to the build piece, and accordingly, positive charge can collect on the build plate and on the conductive build piece to create an electric field similar to the example of FIG. 3. For the purpose of clarity, the electric field lines are not shown in FIG. 7.

Voltage source 703 can be applied to an electron beam source 713 as the acceleration voltage used to create an electron beam 715, which can be scanned by a deflector 717 to fuse powder. In this case, the positive terminal of voltage source 703 is the anode of electron beam source 713. Voltage source 701 is also connected to the anode of electron beam source 713, such that voltage source 701 is applied between the anode and build plate 705. In this way, for example, the voltage applied by voltage source 701 can help reduce powder scatter and increase beam modulation gain by further accelerating the beam for greater beam energy.

In some cases, the electric field generated by various embodiments can cause an energy beam to bend. In this example, the electrons in electron beam 715 can be attracted to the positively-charged conductive build piece 711 and can bend. FIG. 7 shows a zero field beam 719, which represents the path the electron beam would take in a zero electric field to hit a target spot 721. The amount of bending of energy beam 715 can be determined from the strength of the electric field. Therefore, deflector 717 can compensate for the predicted amount of beam bending and can hit target spot 721 by aiming energy beam in a different direction than zero field beam 719, as shown in FIG. 7.

Figure 8:
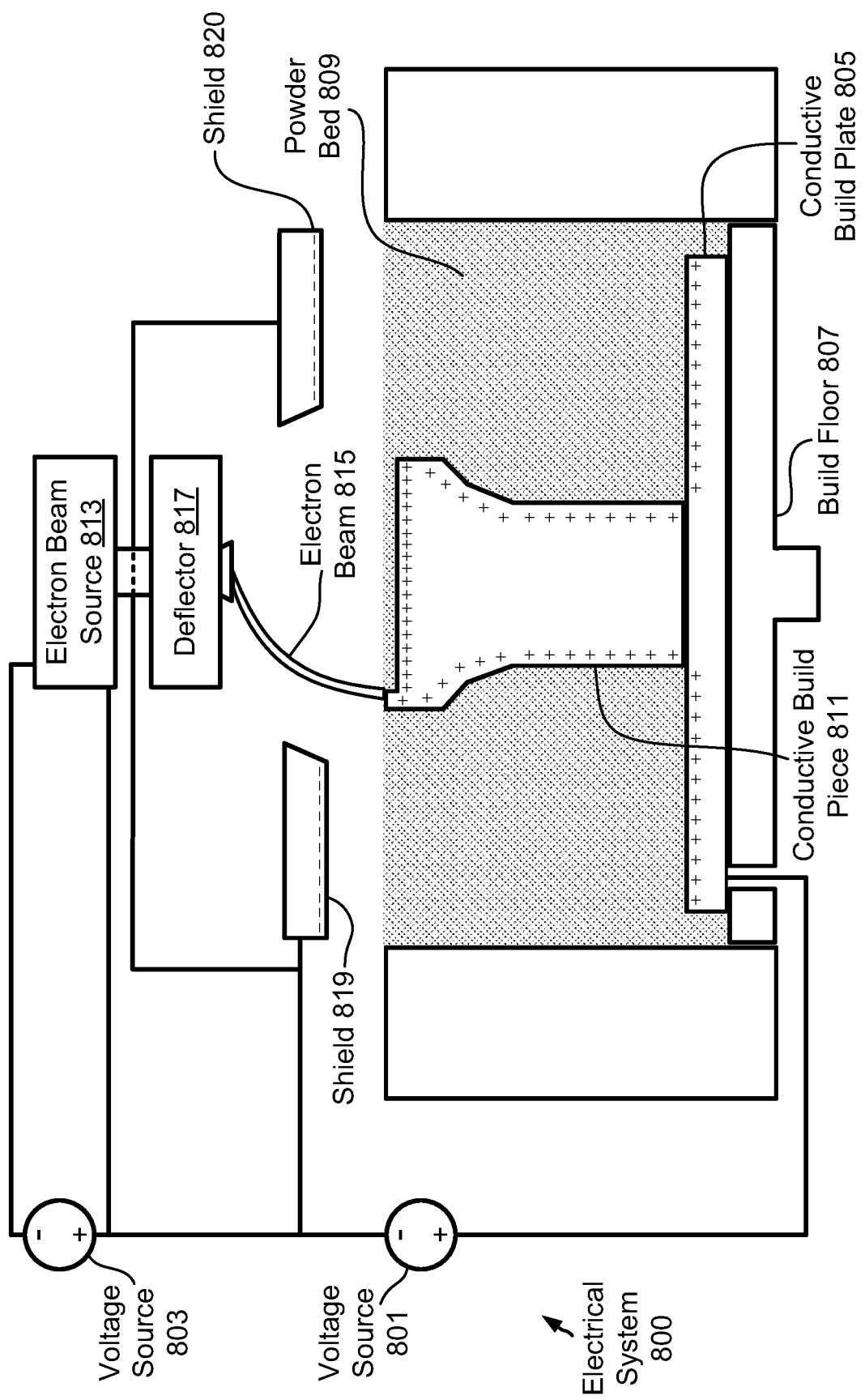
FIG. 8 illustrates an exemplary embodiment of an electrical system including a beam compensation system.

FIG. 8 illustrates an exemplary embodiment of an electrical system including a beam compensation system. Like the example of FIG. 7, an electrical system 800 can include a voltage source 801 and a voltage source 803. Voltage source 803 can be applied to an electron beam source 813 as the acceleration voltage used to create an electron beam 815, which can be applied by a deflector 817 to fuse powder. Voltage source 801 can apply a voltage between an anode of electron beam source 813 and a conductive build plate 805 through an opening in a build floor 807. Conductive build plate 805 and build floor 807 can support a powder bed 809 and a conductive build piece 811. Conductive build plate 805 can be electrically connected to conductive build piece 811, such as being fused to the build piece, and accordingly, positive charge can collect on the build plate and on the conductive build piece to create an electric field similar to the example of FIG. 3. For the purpose of clarity, the electric field lines are not shown in FIG. 8.

Electrical system 800 can include a system with additional structures that can be charged to provide further scatter reduction. In this example, the additional structures can include shields 819 and 820, which can be connected to the negative terminal of voltage source 801. A negative voltage can cause negative charge to collect on shields 819 and 820, which can repulse the negatively charged powder particles in the powder layer of powder bed 809. In other words, the additional charged structures can create an electric field that causes a force between the charged powder particles and the powder layer that pushes the charged powder particles toward the powder layer. In this way, for example, charged powder particle scatter may be further reduced. In various embodiments, the additional structures can be arranged symmetrically around a normal axis extending between the deflector and the powder material support structure. In this way, for example, a deflection of electron beam 815 may be minimized. In various embodiments, for example, a single shield can include a ring of conductive material symmetrically surrounding a normal axis extending between the deflector and the build plate. A constant voltage source can be applied to the ring. The shape of the ring can be, for example, circular, rectangular, a torus, etc. In various embodiments, the shape of the ring can mimic the shape of the surface of the powder bed.

Figure 9:
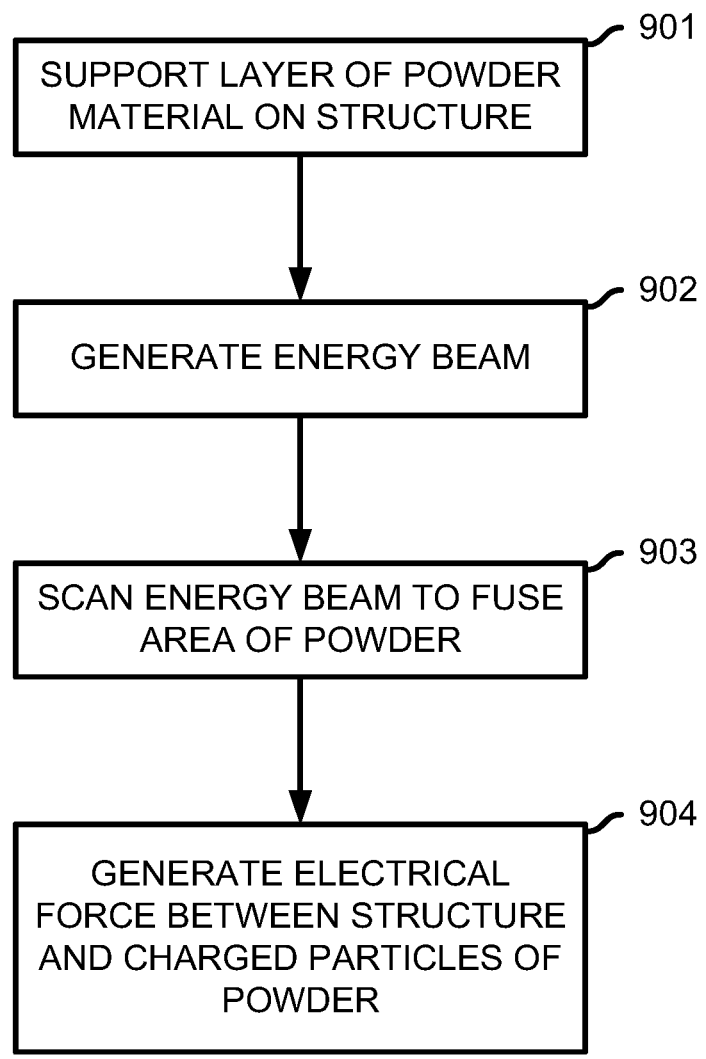
FIG. 9 is a flow chart of an exemplary embodiment of a method of reducing powder scatter in a PBF system.

FIG. 9 is a flow chart of an exemplary embodiment of a method of reducing powder scatter in a PBF system. The PBF system can support (901) a layer of powder material on a structure. For example, a powder layer can be deposited on the top surfaces of a powder bed and one or more build pieces, and the powder bed and the one or more build pieces can be supported by a build plate. The PBF system can generate (902) an energy beam. For example, the PBF system can include an electron beam source that generated an electron beam. The PBF system can scan (903) the energy beam to fuse an area of the powder material in the layer. For example, the PBF system can include a deflector that deflects the electron beam to scan the beam across the powder layer. The energy beam can electrically charge the particles of powder. The PBF system can generate an electrical force between the structure and the charged particles of powder. For example, the PBF system can include an electrical system that applies a voltage between an electron beam source and a structure, such as the build floor, the build plate, the build piece, etc., that creates an electric field resulting in an electrostatic force that attracts the charged particles of powder to the powder layer. In this way, for example, charged powder scatter may be reduced or eliminated.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus for powder-bed fusion, comprising:
    a structure that supports powder material having a plurality of particles of powder, wherein the structure comprises a non-conductive build plate that supports a build piece and the non-conductive build plate has a through-hole;
    an energy beam source that generates an energy beam;
    a deflector that applies the energy beam to fuse an area of the powder material to create a layer of the build piece, wherein the energy beam electrically charges the particles of powder; and
    an electrical system that generates an attractive electrical force between the build piece and the charged particles of powder, wherein the electrical system includes a voltage source configured for connection to the build piece through the through-hole.

2. The apparatus of claim 1, wherein the deflector is further configured to apply the energy beam to the powder material to create a conductive extension to the build piece, wherein the voltage source is further configured for connection to the build piece through the conductive extension.

3. The apparatus of claim 1, wherein the build piece comprises a conductive build piece, wherein the voltage source is further connected to the conductive build piece to cause positive charge to collect on the conductive build piece.

4. The apparatus of claim 1, wherein the structure further comprises a conductive build floor that supports at least one of the powder material or the build piece, wherein the voltage source is further connected to the conductive build floor.

5. The apparatus of claim 1, further comprising one or more shields, wherein the electrical system is further configured to generate a repulsive electrical force between the one or more shields and the charged particles of powder.

6. The apparatus of claim 5, wherein the structure further comprises a build floor, wherein the electrical system includes a voltage source having a positive terminal and a negative terminal, the positive terminal being configured for connection to at least one of the build piece, the non-conductive build plate, or the build floor and the negative terminal being connected to the one or more shields.

7. A method of powder-bed fusion, comprising:
supporting powder material on a structure, the powder material having a plurality of particles of powder and the structure comprising a non-conductive build plate supporting a build piece, the non-conductive build plate having a through-hole;
generating an energy beam;
scanning the energy beam to fuse an area of the powder material to create a layer of the build piece, wherein the energy beam electrically charges the particles of powder; and
generating an attractive electrical force between the build piece and the charged particles of powder by applying a voltage from a voltage source to the build piece, the voltage source being configured for connection to the build piece through the through-hole.

8. The method of claim 7, further comprising applying the energy beam to the powder material to create a conductive extension to the build piece, wherein the voltage source is further configured for connection to the build piece through the conductive extension.

9. The method of claim 7, wherein the build piece comprises a conductive build piece, wherein the voltage source is further connected to the conductive build piece to cause positive charge to collect on the conductive build piece.

10. The method of claim 7, wherein the structure further comprises a conductive build floor that supports at least one of the powder material or the build piece, wherein the voltage source is further connected to the conductive build floor.

11. The method of claim 7, wherein the voltage source is further configured to generate a repulsive electrical force between one or more shields and the charged particles of powder.

12. The method of claim 11, wherein the structure further comprises a build floor, wherein the voltage source has a positive terminal and a negative terminal, the positive terminal being configured for connection to at least one of the build piece, the non-conductive build plate, or the build floor and the negative terminal being connected to the one or more shields.

13. An apparatus for powder-bed fusion, comprising:
a structure that supports powder material, wherein the structure comprises a non-conductive build plate that supports a build piece and the non-conductive build plate has a through-hole;
an energy beam source directed to the powder material to create a layer of the build piece, wherein the energy beam electrically charges a plurality of particles of powder;
a deflector operationally coupled with the energy beam source; and
an electrical system that generates an attractive electrical force between the build piece and the charged particles of powder, wherein the electrical system comprises a voltage source configured for connection to the build piece through the through-hole.

* * * * *